July 25, 1967  R. J. JOHNSON  3,332,826
TEAR SEALING APPARATUS
Filed Oct. 16, 1962  4 Sheets-Sheet 1

INVENTOR.
REINO J. JOHNSON
BY
OSTROLENK, FABER, GERB & SOFFEN
ATTORNEYS

July 25, 1967  R. J. JOHNSON  3,332,826
TEAR SEALING APPARATUS
Filed Oct. 16, 1962  4 Sheets-Sheet 2

INVENTOR.
REINO J. JOHNSON
BY
OSTROLENK, FABER, GERB & SOFFEN
ATTORNEYS

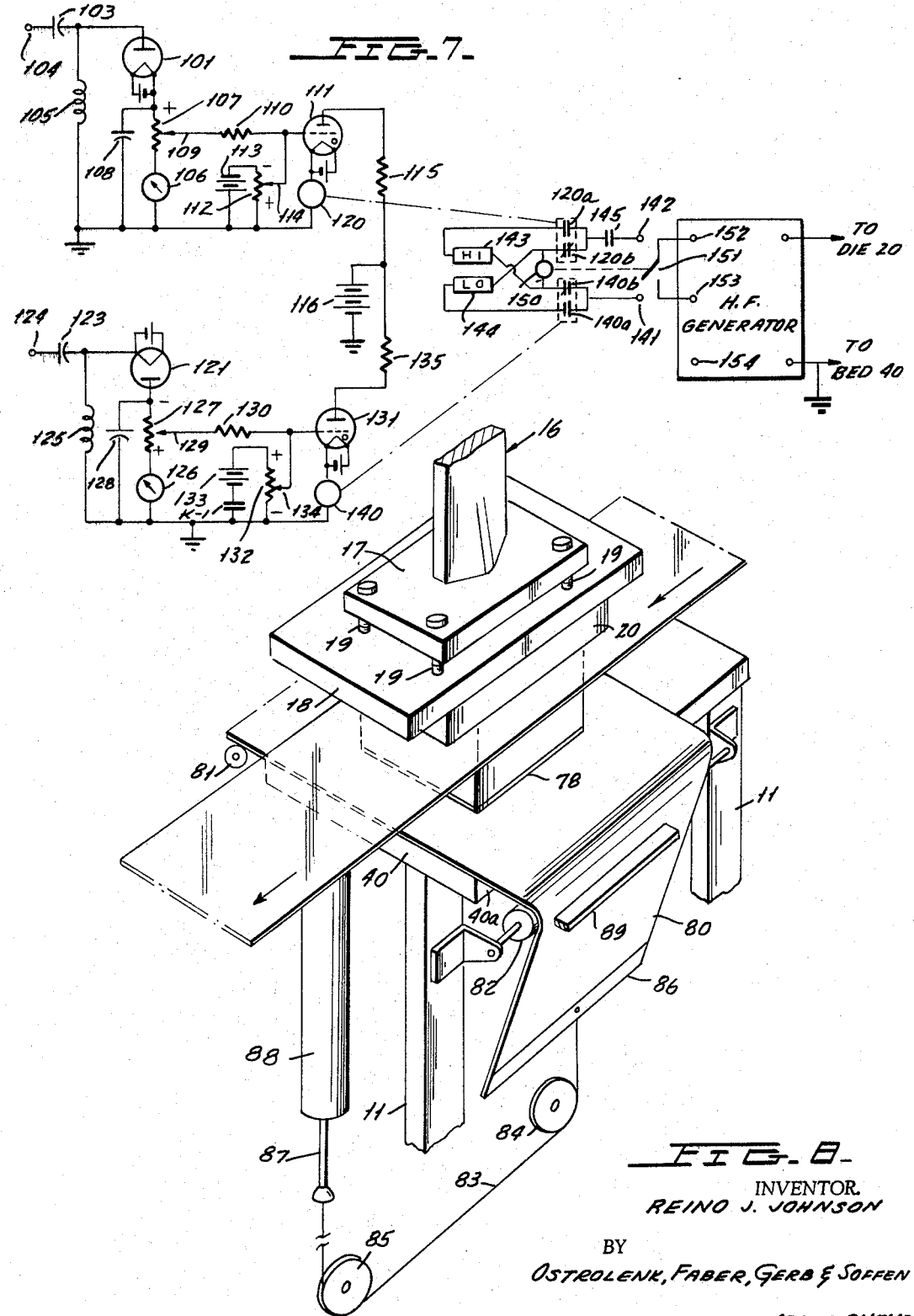

July 25, 1967   R. J. JOHNSON   3,332,826
TEAR SEALING APPARATUS

Filed Oct. 16, 1962   4 Sheets-Sheet 4

INVENTOR.
REINO J. JOHNSON
BY
OSTROLENK, FABER, GERB & SOFFEN
ATTORNEYS

United States Patent Office 3,332,826
Patented July 25, 1967

3,332,826
TEAR SEALING APPARATUS
Reino J. Johnson, Franklin Square, N.Y., assignor to Kabar Manufacturing Corporation, Long Island, N.Y.
Filed Oct. 16, 1962, Ser. No. 230,817
14 Claims. (Cl. 156—515)

The instant invention relates to apparatus for the bonding of thermoplastic materials and more particularly to apparatus for accomplishing a tear sealing operation.

In the prior art, at the time a heat sealing operation is performed to fuse together two sheets of thermoplastic material the material is not severed along the seal unless a special cutting die is employed. It has been found that at the time the thermoplastic material is fused or melted its tensile strength is very low. Utilizing this knowledge the instant invention provides apparatus for tearing the thermoplastic material along the seal when the material is still hot or cold, after being thinned out at the seal line.

Briefly, the instant invention provides apparatus which includes a clamp means through which material passes as it moves between the sealing die and the bed of the machine prior to sealing. After the material is in place the clamp means is closed, the die is brought into operative engagement with the material, heating energy is applied to the die to form a seal, heating energy is removed, and thereafter the clamp means is raised thereby raising the marginal portions of the material to sever these portions from the material positioned below the die. Thereafter, when the die is raised the desired article remains upon the bed of the machine.

The device of the instant invention also includes novel means for removing the article from the bed of the machine. This means comprises the utilization of the buffer as a conveyor. The buffer is arranged to move the article over the edge of the bed where the article will fall into a receiving bin. The buffer material is caused to travel over a path having a sharp bend at the edge of the bed. This sharp bend usually causes the article to part from the buffer. To insure that the article parts from the buffer a scraper device may be employed in the region of the sharp bend.

In another embodiment of this invention, the buffer is a layer of a rigid skid. The skid is provided with an aperture slightly smaller in size than the article being formed. During sealing this aperture is positioned below the die. After the sealing and tearing operations the skid is moved to a delivery position wherein the skid is no longer beneath the die. Thereafter, a plunger descends and drives the finished article through the buffer aperture and an aligned aperture in the skid and the article falls into a bin or special stacking device.

Another feature of the instant invention is a sensing means that is connected across the die and bed to measure the R.F. voltage impressed across the material being sealed. In order for satisfactory sealing to be accomplished the R.F. voltage applied to the material should fall within a specific range. The sensing device is constructed to stop operation of the machine should the R.F. voltage fall either above or below the required voltage range.

Accordingly, a primary object of the instant invention is to provide novel means for the heat sealing of thermoplastic material.

Another object is to provide novel means for the handling of sheet material on a production basis.

Still another object is to provide novel means for removing articles formed by heat sealing operation performed on web material.

A further object is to provide apparatus for heat sealing of thermoplastic material in which the buffer between the die and bed is constructed to constitute a conveyor which removes the finished article from below the die.

A still further object is to provide a novel sensing device for heat sealing equipment utilizing high frequency energy with this sensing device being capable of detecting when the sealing voltage falls either above or below the required range for this voltage to effect proper sealing.

Yet another object is to provide novel tear sealing apparatus.

These as well as other objects of this invention shall become readily apparent after reading the following description of the accompanying drawings in which:

FIGURE 1 is a side elevation of apparatus constructed in accordance with the teachings of the instant invention.

FIGURE 2 is a partial cross-section taken through line 2—2 of FIGURE 1.

Figure 3:
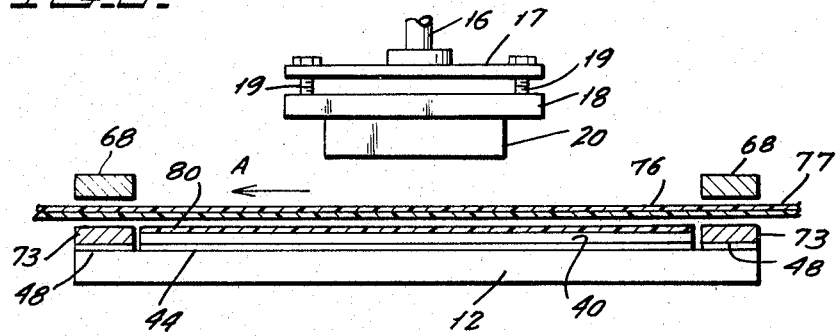
Figure 4:
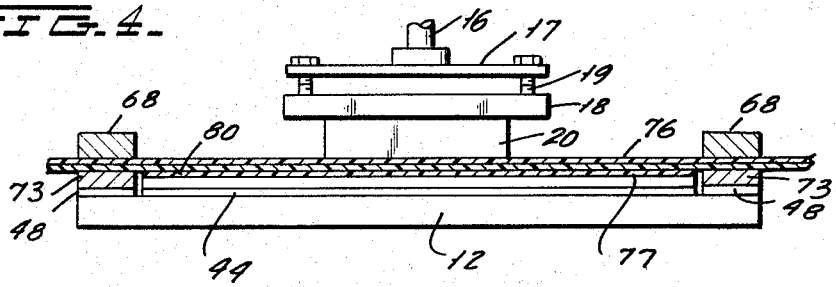
Figure 5:
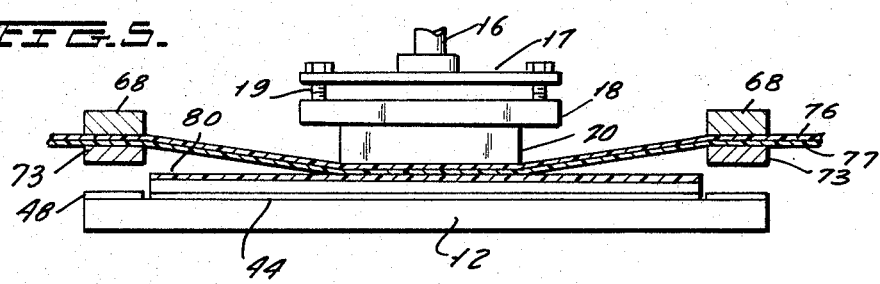
Figure 6:
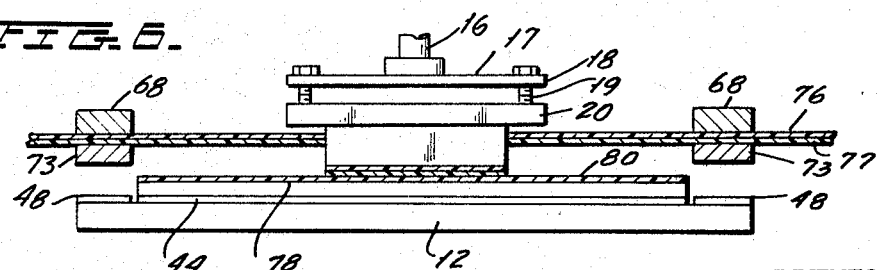

FIGURES 3 through 6 are schematics illustrating the operation of the device. In FIGURE 3 material is being fed through the clamps between the die and bed; in FIGURE 4 the clamps are closed and the die has descended; in FIGURE 5 heat sealing has been accomplished and the clamps are in a partially raised position; and in FIGURE 6 the clamps are in fully raised position with the marginal portions of the web material having been torn from the finished article which is positioned below the die.

FIGURE 7 is an electrical schematic of a circuit which senses when the voltage for the high frequency generator is either too high or too low for effective sealing.

FIGURE 8 is a perspective illustrating the operation of one stripping device.

Figure 9:
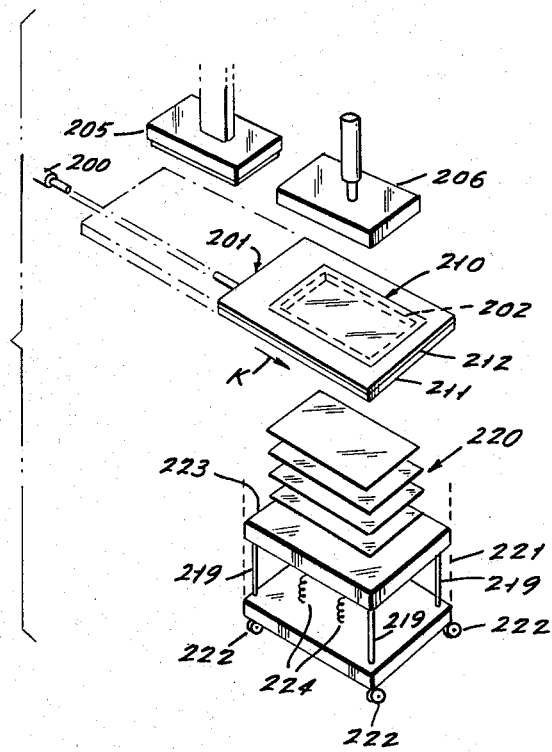

FIGURE 9 is a perspective illustrating another stripping device.

Figure 10:
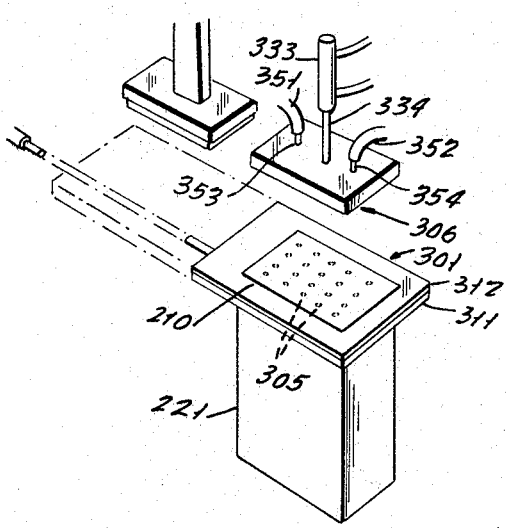

FIGURE 10 is a fragmentary perspective illustrating still another stripping device.

Now referring to the figures. The heat sealing apparatus 10 of the instant invention comprises press stand 11. Bed plate 12 is mounted to the top of stand 11 by means of leveling and adjusting screws 13. Also mounted to the top of stand 11 is C-frame 14 carrying press cylinder 15 which operates ram of press 16 to raise and lower plate 17. Die platen 18 is disposed below insulating plate 17 being mounted thereto by means of leveling and adjusting screws 19. Heat sealing die 20 is mounted to the lower side of platen 18.

Material feed frame 21 is mounted to the right of stand 11 while take-up frame 22 is mounted to the left of stand 11. Drive roll 23 is mounted to shaft 24 which is rotatable within journals fixed with respect to frame 22. Lock, or pressure, roller 25 is mounted to shaft 26 journaled in bearings which are movable vertically with respect to frame 22 by means of clamping device 27.

Feed frame 21 is provided with a plurality of inclined open ended slots 31–33 which receive the ends of shafts 34–36, respectively, having rolls of thermoplastic material 37–39, respectively, mounted thereupon. Idler rolls 41–43 extend parallel to shafts 34–36 serve to guide the material from rolls 37–39 to a point just above press bed 40 which is mounted to bed plate 12. Sub-bed 44 is interposed between plate 12 and bed 40.

The thermoplastic material, after being guided by rollers 41–43, passes above bed 40 and between rollers 23 and 25 and thereafter all three ribbons of thermoplastic material are found about take-up shaft 45 positioned forwardly of take-up frame 22.

Mounted at the front and back edges of bed 40 are clamping devices 46 and 47, respectively. These clamping devices 46, 47 are of substantially identical construction and are arranged to be operated simultaneously. Hence for the sake of brevity without sacrificing clarity only one of these clamping devices 46, 47 will be described in detail.

As best seen in FIGURE 2, clamping device 46 includes bottom tie bar 48 secured to bed plate 12 by means (not shown) well-known to the art. Threaded to bottom tie bar 48 and extending upwardly therefrom are a pair of spaced guide rods 51, 52. The threaded upper ends of guide rods 51, 52 carry stop nuts 53 which serve to position top tie bar 54. The upper ends of guide rods 51, 52 extend through clearance apertures in top tie bar 54 and are received by nuts 55 which secure top tie bar 54 in place. Tie bars 48, 54 and guide rods 51, 52 constitute the frame of clamping device 46. Suitable stabilizing elements (not shown) extend from C-frame 14 to top tie bar 54 lending rigidity to the assembly.

Lift cylinder 60 is secured to top tie bar 54 and extends therebelow. Rod 61 extends downwardly from cylinder 60 with the lower end of rod 61 being in threaded engagement with hold bar 62. The ends of hold bar 62 are provided with apertures which receive inner sleeves 63, 64 slidably mounted to guide rods 51, 52 respectively. Clamping rings 65 secure hold bar 62 to inner sleeves 63, 64 in a manner such that sleeve 63, 64 will move up and down in unison with hold bar 62.

Secured to hold bar 62 and extending therebelow are a pair of clamping cylinders 66. Rods 67 extend from the lower ends of clamping cylinders 66 into threaded engagement with pressure clamp bar 68. Pressure clamp bar 68 is provided with a pair of apertures near the ends thereof which receive outer sleeves 71, 72 slidably mounted to inner sleeves 63, 64, respectively. Suitable clamps 69 secure bar 68 to outer sleeves 71, 72 in a manner such that sleeves 71, 72 move in unison with pressure clamp bar 68.

Disposed below pressure clamp bar 68 at the lower ends of inner sleeves 63, 64 is bottom clamp bar 73. Appropriate apertures are formed in bar 73 near the ends thereof to receive inner sleeves 63, 64. Clamps 74 secure inner sleeves 63, 64 to bottom clamp bar 73 in a manner such that bar 73 moves in unison with sleeves 63, 64. It is noted that in the illustration of FIGURE 1 the ribbons of thermoplastic material pass between pressure clamp bar 68 and bottom clamp bar 73.

As should be apparent to those skilled in the art, operation of lift cylinder 60 is effective to move bars 62, 68 and 73 in unison relative to bottom tie bar 48 which is fixed relative to press bed 40. Further, operation of clamping cylinders 66 is effective to move bar 68 toward and away from bar 73 regardless of the position of hold bar 62.

Reference is now made to FIGURES 3 through 6 for a detailed explanation of the manner in which apparatus 10 operates. For the purpose of this explanation only two ribbons of thermoplastic material 76, 77 are to be welded together. Ribbon 76, 77 are disposed between the pairs of clamp bars 68, 73, above press bar 40 and below die 20. With clamp bars 68, 73 in the open position of FIGURE 3 and the die 20 in raised position ribbons 76, 77 are moved in the direction of arrow A until the portion of material to be sealed is disposed below die 20. Thereafter, pressure clamp bars 68 are lowered to grip ribbons 76, 77, so that the latter cannot move relative to one another, and ram 16 moves operating cylinder die 20 downward into engagement with the upper surface of ribbon 76. With die 20 firmly engaging ribbon 76, high frequency electrical energy from generator 100 (FIGURE 7) is applied between die 20 and bed 40. This energy heats the portions of the thermoplastic material in contact with die 20 to the fusion or melting point thereby making a weld or seal as it is known in the art.

At the time the thermoplastic material is fused or melted its tensil strength is very low. At this time high frequency power is turned off and lift cylinder 60 is operated to raise the pairs of clamps 68, 73. This lifts or pulls the marginal portions of the thermoplastic material 76, 77 against die 20. With ribbons 76, 77 pulling against die 20 it is natural for the weakest parts of ribbons 76, 77 to tear or break. The weakest part of ribbons 76, 77 is along the side of die 20 where the material is still hot. Thus, the material breaks or tears away from the die, sliding along die 20 to the position shown in FIGURE 6 and leaving the heat sealed or finished article 78 in position below die 20.

In order to remove article 78 from bed 40 a delivery device of the type illustrated in FIGURE 8 is utilized. This device comprises a flexible sheet of material 80 such as Teflon, which acts as a buffer during the sealing operation. That is, sheet 80 is interposed between bed 40 and the thermoplastic material which is to be welded and furnishes the necessary dielectric strength between die 20 and bed 40 during the period when the thermoplastic material is molten. Sheet 80 is arranged for movement in a direction transverse to the movement of the thermoplastic material as it is being placed in position under die 20. Rollers 81 and 82, extending parallel to the sides of bed 40 and outward therefrom, guide sheet 80. A weight (not shown) is secured to the end of sheet 80 which is below roller 81 while the other end 86 of sheet 80 is secured to line 83. Line 83 is guided around pulleys 84, 85, positioned below end 86, and is secured to the lower end of rod 87 which is reciprocated by the action of air cylinder 88.

In order to move sheet end 86 downward thereby drawing article 78 past edge 40a of bed 40, cylinder 88 is actuated to draw rod 87 upward. In most instances when article 78 passes roller 82 the sharp bend in sheet 80 causes article 78 to part from sheet 80. However, to insure the separation of article from sheet 80 scraper blade 89, secured to stand 11 by means not shown, is provided in the region adjacent to roller 82 with sheet 80 being interposed between roller 82 and scraper 89.

It is noted that prior to the delivery operation it is necessary to raise die 20. Suitable stripping means of a type well known to the art are provided to insure that article 78 does not move upward with die 20. The weight (not shown) moves sheet end 86 upward after cylinder 88 is deactivated.

It should be realized by those skilled in the art that the buffer stripping device may be eliminated by positioning the bed of the machine in a vertical plane.

After stripping of article 78 cylinder 88 is deactivated, clamp bars 68, 73 are returned to their positions of FIGURE 3. Roll puller 23 and take-up reel 45' are activated by means not shown and predetermined lengths of material are drawn from rolls 37–39 along the top of bed 40. Then the cycle as previously described is repeated. The sequence of operation hereinbefore described may be brought about either automatically or semi-automatically by simple control means well known to the art.

It should be obvious to those skilled in the art that the apparatus heretofore described may be utilized for producing appliques. This is accomplished by feeding the bottom layer of thermoplastic material below the clamps 68, 73 while the lower clamps 73 are in a position slightly raised from bed plate 12. Upper layer or layers of thermoplastic material are fed between the clamp jaws 68, 73 as previously explained. With this arrangement only the layers grasped by jaws 68, 73 will be torn when clamps 68, 73 are raised to the position of FIGURE 6. As is well known to the art, the material forming the bottom layer may be moved across bed 40 at a faster rate than the upper layers of material which feed between clamp jaws 68, 73 and may also be moved transverse thereto by a so-called "four-poster" arrangement.

FIGURE 7 shows a device for sensing whether the high frequency voltage impressed between die 20 and bed 40 is in the proper voltage range to achieve satisfactory sealing. This sensing device comprises high voltage rectifier 101 associated with circuitry for detecting when the voltage output of high frequency generator 100 is too high. The plate of rectifier 101 is connected through decoupling capacitor 103 to terminal 104 which is connected to die 20. D.C. bleeder choke 105 is connected from ground to the junction between capacitor 103 and the plate of rectifier 101. Ammeter 106 and potentiometer 107 are connected in series from ground to the cathode of rectifier 101 with this series combination being paralleled by bypass condenser 108. The circuit hereinbefore described is a conventional half-wave rectifier.

The movable arm 109 of potentiometer 107 is always at a voltage which is positive with respect to ground when H.F. generator functions, with this voltage being applied through decoupling resistor 110 to the control grid of thyratron 111. Potentiometer 112 is connected across battery 113 whose positive terminal is grounded. Accordingly, the movable arm 114 of potentiometer 112 is at a potential negative with respect to ground and is also connected to the control grid of thyratron 111. The plate of thyratron 111 is connected through load resistor 115 to the positive terminal of plate supply source 116 whose negative terminal is grounded. The cathode thyratron 111 is connected through relay coil 120 to ground. Coil 120 is the operating member for a latching relay having a pair of normally open contacts 120a and a pair of normally closed contacts 120b.

The portion of the circuit for detecting when the output of high frequency generator 100 falls below a predetermined value includes high voltage rectifier 121 whose cathode is connected through decoupling capacitor 123 to terminal 124 which is also connected to die 20. Bleeder choke 125 extends from ground to the junction between capacitor 123 and the cathode of rectifier 121. The plate of rectifier 121 is connected through potentiometer 127 and ammeter 126 to ground with the series combination being paralleled by bypass capacitor 128. Thus, movable arm 127 of potentiometer 129 is at a voltage negative with respect to ground with this voltage being impressed through decoupling resistor 130 to the control grid of thyratron 131. Potentiometer 132 extends from ground to the positive terminal of battery 133 whose negative terminal is connected through normally open contacts K-1 to ground. It is noted that contacts K-1 automatically close when high frequency generator 100 is energized.

Movable arm 134 of potentiometer 132 is at a voltage positive with respect to ground with this voltage being impressed upon the grid of thyratron 131. The plate of thyratron 131 is connected through load resistor 135 to the positive terminal of plate supply voltage 116 while the cathode of thyratron 131 is connected through coil 140 to ground. Coil 140 is the operating element of a latching relay having a pair of normally open contacts 140a and a pair of normally closed contacts 140b.

Terminals 141, 142 are adapted to be connected to a voltage source for energizing high and low voltage indicators 143, 144, respectively. There is a series path from terminal 141 through normally closed contacts 140b and high voltage indicator 143 to normally open contacts 120a. With contacts 120a in closed position this path continues through normally open contacts 145 to terminal 142. With contacts 140a in closed position there is another series path from terminal 141 through contacts 140a, low voltage indicator 144, normally closed contacts 120b and contacts 145 to terminal 142. Main contactor coil 150 is connected at one end to the junction between contacts 140b and high voltage indicator 143 and at the other end is connected to the junction between contacts 120b and low voltage indicator 144. Contacts 145 are operated by a time controlled relay for the R.F. voltage.

Coil 150 operates main contactor 151 which is connected across generator terminals 152, 153. Terminals 153 and 154 of generator 100 are adapted to be connected to the energizing voltage source for generator 100.

Operation of the sensing device occurs in the following manner. When the sealing voltage rises above a desired value thyratron 111 is caused to fire. Current of sufficiently high magnitude energizes relay coil 120 thereby opening contacts 120b and closing contacts 120a. At this time there is a complete circuit between terminals 141, 142 extending from terminal 141 through contacts 140b, high voltage indicator 143, contacts 120a and contacts 145 to terminal 142. More important, the opening of contacts 120b causes means contactor coil 150 to be de-energized thereby opening main contacts 151 and de-energizing high frequency generator 100.

Upon the occurrence of a low voltage condition thyratron 131 fires passing current through relay coil 140 so that contacts 140a close and contacts 140b open. As in the case of the occurrence of a high voltage this interrupts the energizing circuit for main contactor coil 150 thereby de-energizing high frequency generator 100. At the same time an energizing circuit is completed for low voltage indicator 144. This circuit extends from terminal 141, through contacts 140a, low voltage indicator 144, contacts 120b and contacts 145 to terminal 142.

The embodiment of the stripping device illustrated in FIGURE 9 comprises air cylinder 200 arranged to horizontally reciprocate skid 201 along line K between a sealing position and a delivery position. In the sealing position, cut-out 202 in skid 201 is positioned below sealing die 205 while in the delivery position cut-out 202 is positioned below ram operated ejector 206 controlled by air cylinder 233.

It is noted that cut-out 202 is slightly smaller than sealing die 205. Because of this, gravity will not drive the finished article 210 through cut-out 202.

Skid 201 is constructed of a lower metal plate 211 and an upper sheet of buffer material 212. Plate 211 is electrically connected to the bed plate so as to constitute one of the sealing electrodes.

In operation, sealing die 205 is lowered when skid 201 is in the sealing position. After the sealing and tearing operations as previously described die 205 is raised with finished article 210 remaining on buffer 212 over cut-out 202. Cylinder 200 is then operated to move skid 201 to sealing position, and the operation previously described is repeated.

When article 210 is driven through cut-out 202 the former drops into a receiving means 220. Means 220 comprises a bin 221 mounted on wheels 222. Positioned internally of bin 221 is a horizontal receiving plate 223 which is biased upwardly by compression springs 224 and guided by rods 219.

Springs 224 are of such a strength that when plate 223 does not support any articles 210 plate 223 is nearly at the top of bin 221. As articles 210 are stacked upon plate 223 the latter moves downward by an amount such that the top article 210 in the stack is just about at the top of bin 221.

In the embodiment of FIGURE 10 skid 201 is replaced by skid 301 and ram 206 is replaced by vacuum box 306. Skid 301 is constructed of lower metal plate 311 and an upper sheet of buffer material 312. Plate 311 is electrically connected to the bed plate so as to constitute one of the sealing electrodes. Skid 301 is provided with a plurality of apertures 305 in the region below which article 210 is formed. Conduits 351 and 352 are connected through suitable control valve means to vacuum and pressure sources, respectively, and are both connected to vacuum box 306 at fittings 353 and 354, respectively. Vacuum box 306 is mounted to the lower end of rod 334 extending from double acting cylinder 333.

The device of FIGURE 10 is operated in the following manner. After article 210 is formed as by the tear sealing method previously described, cylinder 200 is actuated to project skid 301 to the position illustrated in FIGURE 10. In this position article 210 is disposed below vacuum box 306. Cylinder 333 is then actuated to lower box 306 into a position slightly above article 210 or in engagement therewith. Vacuum is applied to box 306 through line 351 causing article 210 to be drawn against the underside of box 306. Box 306 is then raised and skid 301 withdrawn. Thereafter, the vacuum in box 306 is cut off to release article 210. To insure release of article 210 pressure may be introduced through line 352. The release of article 210 may occur with box 306 in a raised position in which event article 210 will fall into bin 221 or else the release of article 210 may occur after box 306 has been lowered to a position either slightly above or at the entrance to bin 221.

Thus, this invention provides novel apparatus for performing heat sealing operations on thermoplastic material. More specifically, the improvements reside in the provision of novel means for expeditiously feeding material to the apparatus and the removability of the finished article. In addition there is provided novel sensing means to determine when the operating voltages applied between die and bed fall outside the range for achieving satisfactory sealing.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described comprising a die means and a bed means mounted for relative movement between a working position close to one another and a nonworking position wherein they are substantially spaced from each other, a clamp means operable between an open and a closed position, transport means for intermittently moving material through said clamp means when it is in said open position and between said die means and said bed means when they are in said non-working position, means for moving said clamp means in said closed position away from said bed means when said die means and said bed means are in said working position wherein portions of material positioned below said die means are in operative position with respect to said die means, and, after desired working operations have been performed, marginal portions of material are torn away from portions of material under said die means.

2. The device of claim 1 also comprising a removal means positioned between said bed means and material which is below said die means, means for operating said removal means after said lift means has been moved away from said bed means and said die means and said bed means are in said non-operating position.

3. The device of claim 2 in which the removal means comprises a flexible sheet movable over an edge of said bed means.

4. A device of the class described comprising a bed, a die positioned above said die and operable between a raised position and lowered position in close proximity to said bed, a clamping means positioned at opposite sides of said bed and operable from a clamp to a release position, transport means for moving material through said clamp means when it is in said release position and below said die when it is in said raised position, energy means for supplying working energy to material below said die when the latter is in said lowered position, additional means for raising said clamp means while said die is in said lowered position and after working energy has been applied whereby marginal material is drawn upwardly along said die means and a desired article formed below said die remains in place.

5. The device of claim 4 also comprising means for removing articles left below said die after the latter is moved to said raised position.

6. The device of claim 4 also comprising a member of flexible sheet material positioned above said die and below material positioned below said die, and means for operating said member over an edge of said bed to remove articles left below said die after the latter is moved to said raised position.

7. The device of claim 6 in which said energy means supplies R.F. energy between said die and said bed to heat predetermined areas of material positioned therebetween; said flexible sheet material comprising an insulating buffer to retard the formation of arcs between said die and said bed.

8. The device of claim 6 also comprising a scraper operatively positioned near the surface of said flexible sheet material to engage and thereby remove articles carried by said flexible sheet material.

9. The device of claim 6 in which said flexible sheet material will not adhere to said bed or to articles moved by said transport means.

10. The device of claim 9 in which the flexible sheet material comprises Teflon coated fiberglass.

11. The device of claim 6 in which the flexible sheet material is subjected to a sharp bend at a point past the edge of the bed.

12. The device of claim 11 in which there is a scraper means operatively positioned adjacent the surface of said flexible sheet material near the sharp bend so as to engage and thereby cause removal of articles carried by said flexible sheet material.

13. A device of the class described comprising a die means and a bed means mounted for relative movement between a working position close to one another and a non-working position wherein they are substantially spaced from each other, a clamp means operable between an open and a closed position, transport means for intermittently moving material through said clamp means when it is in said open position and between said die means and said bed means when they are in said non-working position, means for moving said clamp means in said closed position away from said bed means when said die means and said bed means are in said working position wherein portions of material positioned below said die means are in operative position with respect to said die means, and, after desired working operations have been performed, marginal portions of material are torn away from portions of material under said die means, a removal means positioned between said bed means and material which is below said die means, means for operating said removal means after said lift means has been moved away from said bed means and said die means and said bed means are in said non-operating position, said removal means comprising a sheet of buffer material having portions defining a cut-out, said cut-out being smaller than said die means and being positioned therebelow during sealing whereby finished articles are formed upon said sheet over said cut-out, ejector means, said means for operating said removal means operable to move said sheet to a delivery position wherein said cut-out is positioned below said ejector means, and means for operating said ejector to drive finished articles through said cut-out.

14. A device of the class described comprising a die means and a bed means mounted for relative movement between a working position close to one another and a non-working position wherein they are substantially spaced from each other, a clamp means operable between an open and a closed position, transport means for intermittently moving material through said clamp means when it is in said open position and between said die means and said bed means when they are in said non-working position, means for moving said clamp means in said closed position away from said bed means when said die means and said bed means are in said working position wherein portions of material positioned below said die means are in operative position with respect to said die means, and, after desired working operations have been performed, marginal portions of material are torn away from portions of material under said die means, a removal means positioned between said bed means and material which is below said die means, means for operating said removal means after said lift means has been moved away from said bed means and said die means and said bed means are in said non-operating position, said removal means comprising a sheet of buffer material having a portion positioned below said die means during sealing whereby finished articles are formed upon said portion, another means for transferring articles from said sheet to a receiving apparatus, said another means comprising an element and means for selectively applying a vacuum to said element, said means for operating said removal means operable to move said sheet to a delivery position wherein said element is positioned below said element, and means for applying said vacuum to said element when said sheet is in said delivery position whereby an article is held to said element after said sheet is removed from said delivery position.

References Cited

UNITED STATES PATENTS

| | | | |
|---|---|---|---|
| 2,858,009 | 10/1958 | Bainbridge | 214—6 |
| 2,956,145 | 10/1960 | Hijmans | 219—10.77 |
| 2,960,593 | 11/1960 | Kohler | 219—10.77 |
| 2,961,031 | 11/1960 | Fener | 156—380 |
| 3,006,801 | 10/1961 | Pfeffer | 156—380 |
| 3,035,143 | 5/1962 | Leatherman | 219—10.77 |

EARL M. BERGERT, *Primary Examiner.*

DOUGLAS J. DRUMMOND, *Examiner.*